US008046453B2

(12) United States Patent  
Olaiya

(10) Patent No.: US 8,046,453 B2  
(45) Date of Patent: Oct. 25, 2011

(54) ILLUSTRATION SUPPORTED P2P MEDIA CONTENT STREAMING

(75) Inventor: Oladipupo Olaiya, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 498 days.

(21) Appl. No.: 11/858,294

(22) Filed: Sep. 20, 2007

(65) Prior Publication Data

US 2009/0083412 A1 Mar. 26, 2009

(51) Int. Cl.  
*G06F 15/173* (2006.01)

(52) U.S. Cl. ......... 709/224; 709/227; 709/223; 370/230

(58) Field of Classification Search ................. 709/224  
See application file for complete search history.

(56) References Cited

U.S. PATENT DOCUMENTS

| | | | | |
|---|---|---|---|---|
| 5,719,593 | A * | 2/1998 | De Lange ............... | 345/422 |
| 5,959,623 | A | 9/1999 | van Hoff et al. | |
| 5,974,398 | A | 10/1999 | Hanson et al. | |
| 6,574,793 | B1 | 6/2003 | Ngo et al. | |
| 6,698,020 | B1 * | 2/2004 | Zigmond et al. ........ | 725/34 |
| 6,738,978 | B1 | 5/2004 | Hendricks et al. | |
| 6,799,326 | B2 | 9/2004 | Boylan, III et al. | |
| 6,820,277 | B1 | 11/2004 | Eldering et al. | |
| 6,937,770 | B1 * | 8/2005 | Oguz et al. ........... | 382/235 |
| 7,100,183 | B2 | 8/2006 | Kunkel et al. | |
| 7,113,773 | B2 | 9/2006 | Quick, Jr. et al. | |
| 7,134,132 | B1 | 11/2006 | Ngo et al. | |
| 7,146,627 | B1 | 12/2006 | Ismail et al. | |
| 7,228,555 | B2 | 6/2007 | Schlack | |
| 7,376,747 | B2 * | 5/2008 | Hartop ................. | 709/233 |
| 2002/0157034 | A1 * | 10/2002 | Sagar ................... | 714/4 |
| 2002/0161898 | A1 * | 10/2002 | Hartop et al. .......... | 709/227 |
| 2003/0067872 | A1 * | 4/2003 | Harrell et al. .......... | 370/229 |
| 2004/0268400 | A1 * | 12/2004 | Barde et al. ............ | 725/94 |
| 2005/0039205 | A1 | 2/2005 | Riedl | |

(Continued)

FOREIGN PATENT DOCUMENTS

WO WO 03/015406 A2 2/2003  
WO WO 2007139073 A1 * 12/2007

OTHER PUBLICATIONS

Jakob Nielson's Alertbox, Aug. 8, 1999, "Video and Streaming Media," http://www.useit.com/alertbox/990808.html.

(Continued)

*Primary Examiner* — Firmin Backer  
*Assistant Examiner* — Hamza Algibhah  
(74) *Attorney, Agent, or Firm* — Withrow & Terranova, PLLC

(57) ABSTRACT

A system and method for Peer-to-Peer (P2P) media content streaming are provided. In one embodiment, prior to streaming desired original media content, a playback agent of a first peer playback device downloads illustration media content, which is a derivate light-weight version of the original media content. The playback agent then initiates streaming of the original media content from one or more other peer playback devices hosting the original media content or a segment thereof. The playback agent monitors a quality of the network connection to the other peer playback devices streaming the original media content to the playback agent. If the quality of the network connection falls below a defined threshold, the playback agent switches playback to the illustration media content. Once the quality of the network connection improves or a new connection is established, the playback agent switches playback back to the streaming original media content.

25 Claims, 6 Drawing Sheets

U.S. PATENT DOCUMENTS

| | | |
|---|---|---|
| 2005/0108776 A1 | 5/2005 | Carver et al. |
| 2005/0286546 A1 | 12/2005 | Bassoli et al. |
| 2006/0004600 A1* | 1/2006 | Summer et al. .................... 705/1 |
| 2006/0107302 A1 | 5/2006 | Zdepski |
| 2006/0190615 A1 | 8/2006 | Panwar et al. |
| 2006/0230107 A1 | 10/2006 | Yu et al. |
| 2006/0262651 A1* | 11/2006 | Cooper et al. ................... 368/68 |
| 2007/0094405 A1 | 4/2007 | Zhang |
| 2008/0205291 A1* | 8/2008 | Li et al. ......................... 370/254 |
| 2009/0241156 A1* | 9/2009 | Nishida ......................... 725/116 |
| 2009/0254205 A1* | 10/2009 | Orlov et al. ..................... 700/94 |

OTHER PUBLICATIONS

Video Advertising—Yume, http://www.yumenetworks.com/.
Vuze by Azureus, http://www.vuze.com/app.
SopCast—Free P2P internet TV, http://www.sopcast.com/.
Joost—Free online TV, http://www.joost.com/.
Content Delivery and Distribution Networks, http://www.web-caching.com/cdns.html.
International Search Report and Written Opinion for PCT/US08/74141 mailed Nov. 7, 2008.

* cited by examiner

ILLUSTRATION SUPPORTED P2P MEDIA CONTENT STREAMING

FIELD OF THE INVENTION

The present invention relates to streaming media content.

BACKGROUND OF THE INVENTION

Peer-to-Peer (P2P) architectures are emerging as a potential platform for future Video-on-Demand (VOD) systems. VOD content may be provided in a downloadable format or a streaming format. Particularly with respect to the streaming format, one issue is that peer nodes in a P2P system are under loose autonomous control and are therefore unreliable. For example, a device owner may decide to power down his or her peer device at any time. As a result, if a peer device is streaming VOD content to another peer device and then suddenly goes offline, playback is interrupted. Such interruptions are unacceptable to viewers. Thus, there is a need for a P2P architecture for delivering VOD content that alleviates interruptions in playback resulting from an unstable network.

SUMMARY OF THE INVENTION

The present invention provides a system and method for Peer-to-Peer (P2P) media content streaming. In one embodiment, prior to streaming desired original media content, a playback agent of a first peer playback device downloads illustration media content, which is a derivate light-weight version of the original media content. The playback agent then initiates streaming of the original media content from one or more other peer playback devices hosting the original media content or a segment thereof. The playback agent monitors a quality of the network connection to the other peer playback devices streaming the original media content to the playback agent. If the quality of the network connection falls below a defined threshold, the playback agent switches playback to the illustration media content. Thereafter, once the quality of the network connection improves or a new connection is established, the playback agent switches playback back to the streaming original media content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
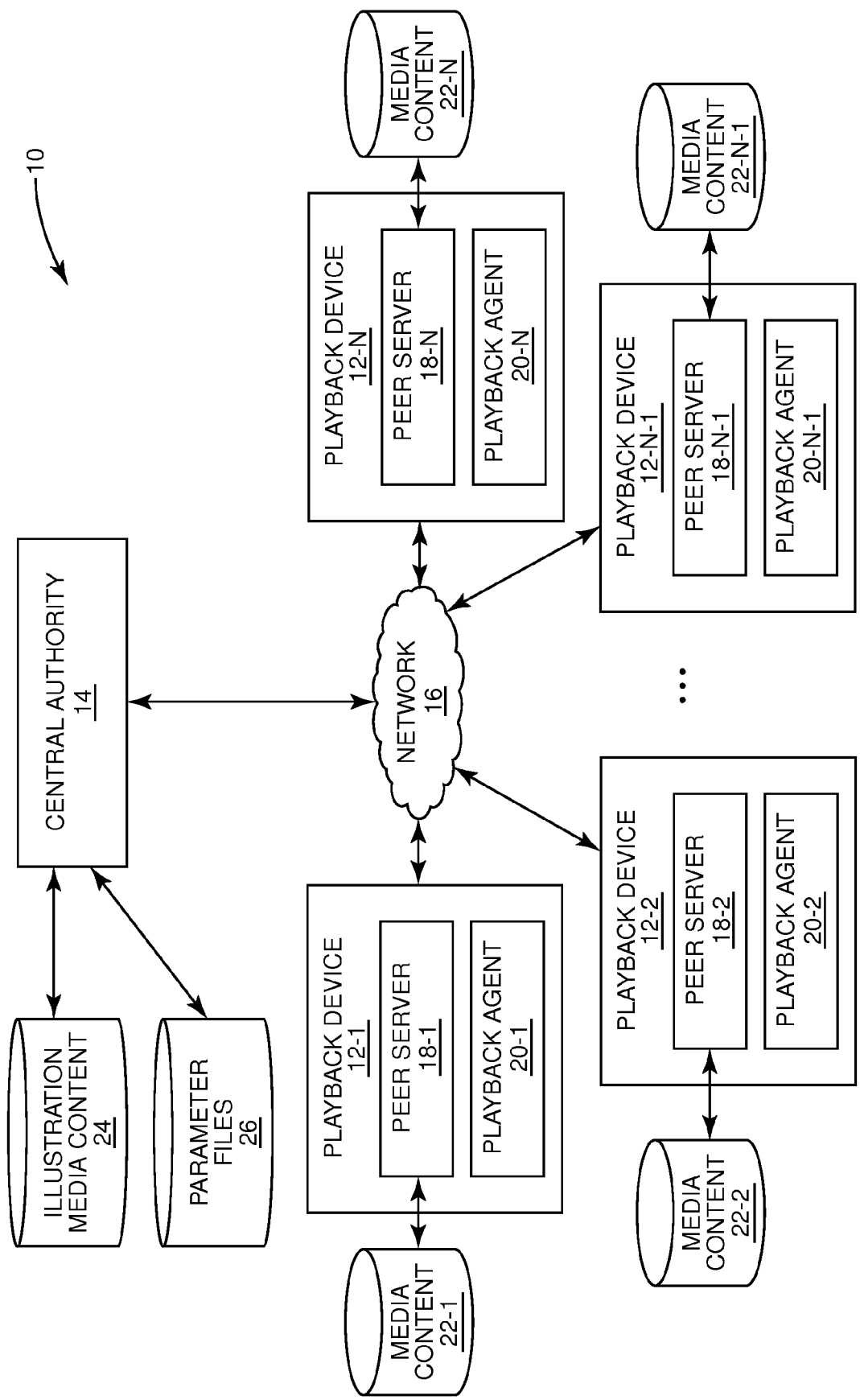
FIG. 1 illustrates a Peer-to-Peer (P2P) media content delivery system according to one embodiment of the present invention.

FIG. 1 illustrates an exemplary Peer-to-Peer (P2P) media content delivery system 10 according to one embodiment of the present invention. In the preferred embodiment discussed herein, the system 10 is a P2P Video-on-Demand (VOD) delivery system. However, the present invention is not limited thereto. The system 10 may additionally or alternatively delivery other types of media content. In general, the system 10 includes a number of peer playback devices 12-1 through 12-N and, optionally, a central authority 14 interconnected by a network 16. The peer playback devices 12-1 through 12-N are hereinafter referred to as playback devices 12-1 through 12-N. The network 16 may be a Wide Area Network (WAN), Local Area Network (LAN), or a combination thereof and may include wired, wireless, or both wired and wireless components.

Each of the playback devices 12-1 through 12-N may be, for example, a set-top box; a personal computer; a mobile device such as a mobile telephone, mobile media player, or Personal Digital Assistant (PDA); a gaming console; a mobile gaming device; or the like. In general, the playback device 12-1 includes a peer server 18-1 and a playback agent 20-1 each of which may be implemented in software, hardware, or a combination thereof. The peer server 18-1 operates to host and serve media content 22-1 to the other playback devices 12-2 through 12-N according to the P2P media content delivery scheme of the system 10. The media content 22-1 includes a number of media content items or segments of the media content items. In the preferred embodiment, the media content items may be, for example, video content items such as movies and television programs such that the system 10 operates to provide video content in a VOD manner. However, the media content items may additionally or alternatively include, for example, home movies or video clips. Still further, the media content items may include other types of media content such as, for example, audio content. Like the playback device 12-1, the playback devices 12-2 through 12-N include peer servers 18-2 through 18-N and playback agents 20-2 through 20-N, respectively. The peer servers 18-2 through 18-N operate to host and serve media content 22-2 through 22-N, respectively. Note that the system 10 may also include one or more peer playback devices that include a playback agent and do not host media content. As such, these playback devices may not include a peer server.

The central authority 14 may be implemented on a central server. Alternatively, the central authority 14 may be implemented on one of the playback devices 12-1 through 12-N, or the functionality of the central authority 14 may be distributed among any number of the playback devices 12-1 through 12-N. Note that the central authority 14 is optional and not necessary for the present invention. One of ordinary skill in the art will appreciate that the system 10 may be implemented without the central authority 14 upon reading this disclosure.

In this embodiment, the central authority 14 operates to host illustration media content 24 and corresponding parameter files 26. The illustration media content 24 includes an illustration media content item for each of the media content items hosted by the playback devices 12-1 through 12-N. As used herein, an illustration media content item is a lightweight derivative version of a corresponding media content item. For example, if the media content item is a movie, the corresponding media content item may be a slideshow formed by frames extracted from the movie. In addition, the illustration media content item may include audio content accompanying the slideshow. The audio component may be, for example, a narrative or summary of the movie or an audio component of the movie. As further examples, an illustration media content item may be a low or reduced quality version of a media content item, audio content providing a narrative or summary of the media content item, an audio only component of the media content item, or the like.

The parameter files 26 include a parameter file for each of the illustration media content items. In one embodiment, a parameter file includes, for example, a length of the media content item, a length of the illustration media content item, and a synchronization time ratio enabling the media content item and the illustration media content item to be synchronized. In addition, the parameter file may include information such as, for example, the number of segments in the media content item and the illustration media content item. Still further, if the illustration media content item is a slideshow, the parameter file may include information defining a number of still pictures per segment and the resolution of the still pictures. Also, if the length of illustration media content item is less than the length of the media content item, the parameter file may include a playback configuration parameter allowing continuous playback of the illustration media content item.

In operation, a user at, for example, the playback device 12-1 selects a media content item for playback. In response, the playback agent 20-1 downloads the corresponding illustrative media content item from, in this embodiment, the central authority 14 and initiates streaming from one or more of the peer servers 18-2 through 18-N hosting the media content item. As the media content item is streamed to the playback agent 20-1, the playback agent 20-1 monitors a quality of the connection or connections delivering the streaming media content item. If the quality is unsuitable for delivery of the streaming media content item, the playback agent 20-1 switches playback to the illustration media content item. When the quality becomes suitable for the delivery of the streaming media content item, the playback agent 20-1 switches playback back to the streaming media content item. As a result, the playback experience at the playback device 12-1 is not interrupted as a result of a failed connection or loss of quality in a connection delivering the streaming media content item.

Figure 2:
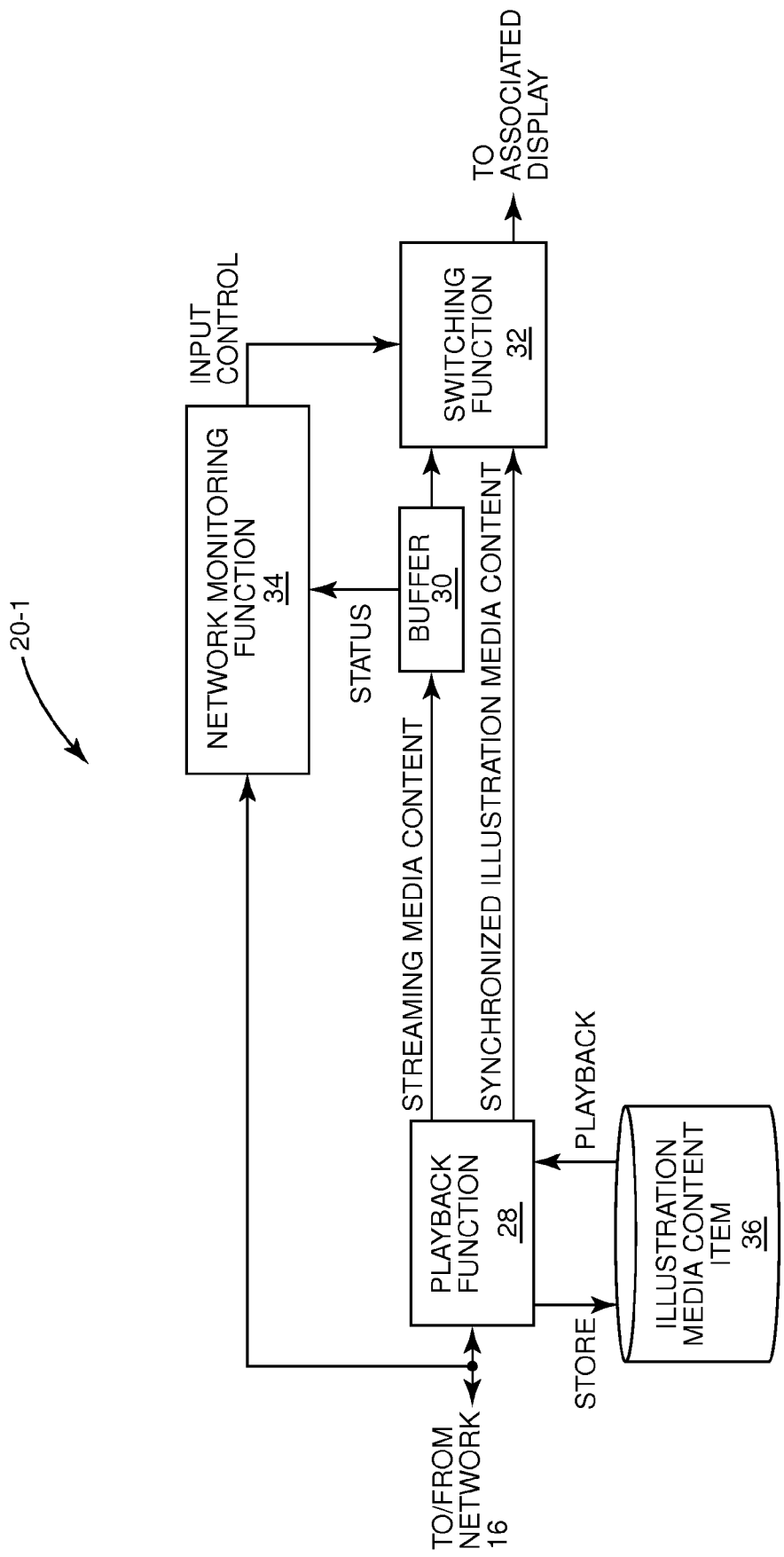
FIG. 2 is a functional block diagram of the playback agent of one of the peer playback devices of FIG. 1 according to one embodiment of the present invention.

FIG. 2 is a functional block diagram of the playback agent 20-1 of FIG. 1 according to one embodiment of the present invention. In general, the playback agent 20-1 includes a playback function 28, a buffer 30, a switching function 32, and a network monitoring function 34 each of which may be implemented in software, hardware, or a combination of software and hardware. The playback function 28 generally operates to download an illustration media content item 36 corresponding to a desired original media content item, initiate streaming of the original media content item from one or more of the peer servers 18-2 through 18-N of the other playback devices 12-2 through 12-N hosting the original media content item, optionally process the streaming original media content item, and output the streaming original media content item or the processed version thereof to the buffer 30 via a streaming media content output. From the buffer 30, the streaming original media content is passed to the switching function 32. As discussed below, when the quality of the network connection to the one or more peer servers 18-2 through 18-N streaming the original media content item to the playback function 28 is at an acceptable level, the switching function 32 is controlled by the network monitoring function 34 such that the streaming original media content item is presented to one or more associated users via an associated display. The display may or may not be part of the playback device 12-1.

In addition, the playback function 28 operates to synchronize the illustration media content item 36 and the streaming original media content item as the streaming original media content item is received. Alternatively, the playback function 28 may synchronize the illustration media content item 36 and the streaming original media content item when it is desired to switch playback from the streaming original media content item to the illustration media content item 36 due to a poor network connection. In this embodiment, the synchronized illustration media content item is output by the playback function 28 to the switching function 32 via a synchronized illustration media content output. Note that the parameter file for the illustration media content item 36 may be used for synchronization. More specifically, where the parameter file includes a synchronization time ratio, the playback function 28 uses the synchronization time ratio to synchronize the illustration media content item 36 to the streaming original media content item. When the quality of the network connection to the one or more peer servers 18-2 through 18-N streaming the original media content item to the playback function 28 is not acceptable, the switching function 32 is controlled by the network monitoring function 34 such that the synchronized illustrative media content item, rather than the streaming original media content item, is presented to one or more associated users via the associated display.

As discussed below, the network monitoring function 34 operates to monitor a quality of the network connection to one or more of the peer servers 18-2 through 18-N streaming the original media content item to the playback function 28. When the network monitoring function 34 detects that the connection is poor, the network monitoring function 34 controls the switching function 32 via an input control such that the synchronized illustration media content item, rather than the streaming media content item, is output to the associated display. When the quality of the network connection thereafter improves to an acceptable level, the network monitoring function 34 controls the switching function 32 to switch playback back to the streaming media content item.

Figure 3:
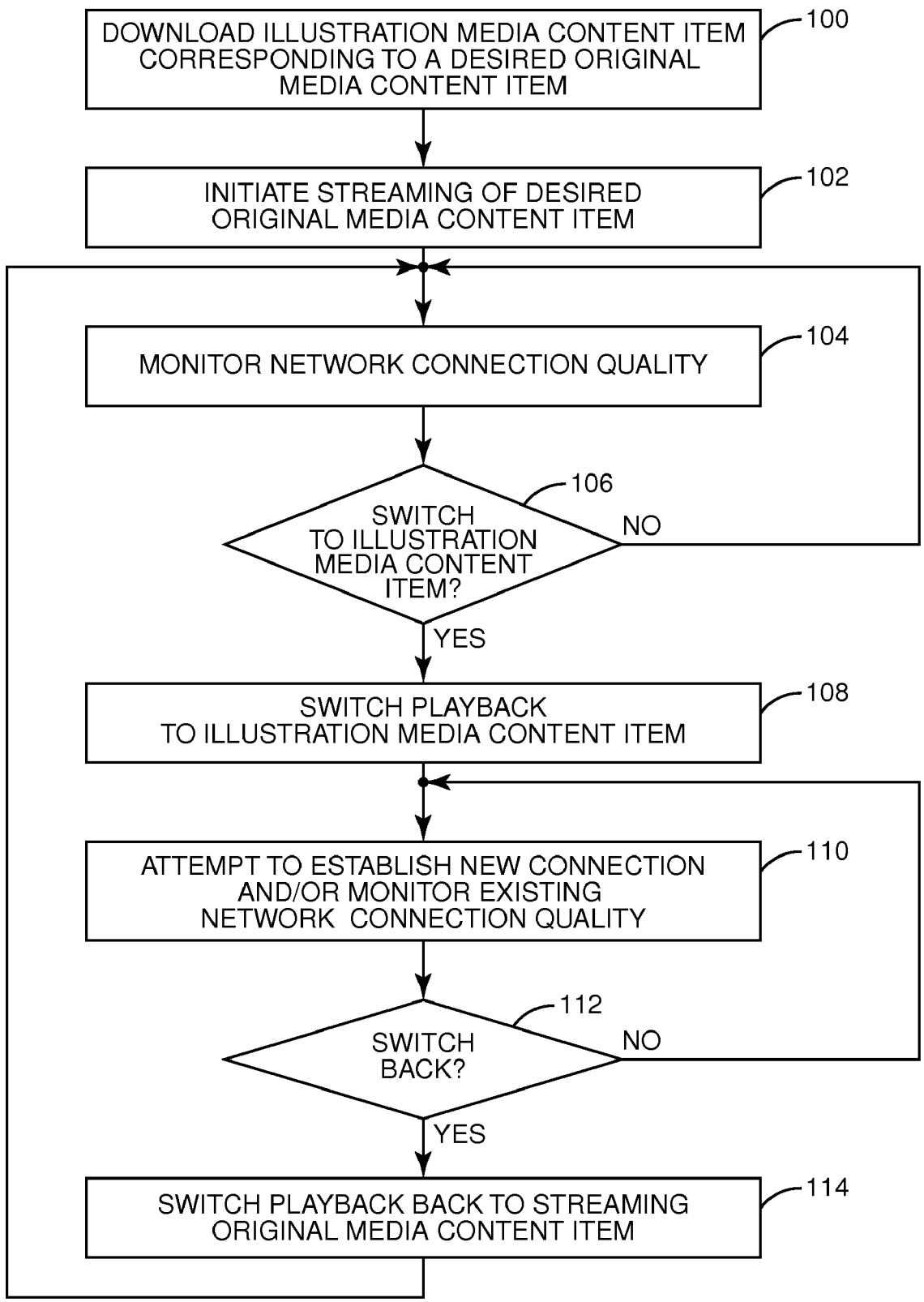
FIG. 3 is a flow chart illustrating the operation of the playback agent of FIG. 2 according to one embodiment of the present invention.

FIG. 3 illustrates the operation of the playback agent 20-1 of FIG. 2 according to one embodiment of the present invention. First, the playback function 28 downloads the illustration media content item 36 corresponding to a desired original media content item and stores the illustration media content item 36 locally (step 100). In one embodiment, the illustration media content item 36 is hosted by the central authority 14 (FIG. 1) and is therefore downloaded from the central authority 14. However, the present invention is not limited thereto. The illustration media content item 36 may be hosted by, and therefore downloaded from, one or more of the peer servers 18-2 through 12-N of the other playback devices 12-2 through 12-N. The playback function 28 downloads the illustration media content item 36 in response to a user of the playback device 12-1 selecting the original media content item for playback. Note that the playback device 12-1 may provide a search function, menu function, or the like enabling the user to locate and select the desired original media content item for playback. Once the desired original media content item is selected, the playback function 28 contacts the central authority 14 to download the illustration media content item for the desired original media content item.

Once download of the illustration media content item 36 is complete, the playback function 28 initiates streaming of the desired original media content item from one or more of the peer servers 18-2 through 18-N of the other playback devices 12-2 through 12-N hosting the desired original media content item or a segment thereof (step 102). While in this embodiment the illustration media content item 36 is completely downloaded prior to initiating streaming of the original media content item, the present invention is not limited thereto. For example, the playback function 28 may initiate streaming after a predetermined amount of the illustration media content item 36 is downloaded. As another example, the playback function 28 may initiate streaming of the original media content item and downloading of the illustration media content item 36 in parallel.

In one embodiment, the central authority 14 performs a tracking function in order to maintain information identifying the peer servers 18-1 through 18-N hosting each of a number of media content items, or segments of the media content items, in the system 10. As such, the playback function 28 may initiate streaming of the desired original media content item by first requesting the desired original media content item or information identifying the peer servers 18-2 through 18-N hosting the desired original media content item from the central authority 14. The central authority 14 may then provide information enabling the playback function 28 to connect to one or more of the peer servers 18-2 through 18-N hosting the desired original media content item or effect connection of the playback function 28 to the one or more peer servers 18-2 through 18-N hosting the desired original media content item. Alternatively, the central authority 14 may effect a connection between the playback function 28 and one or more peer servers 18-2 through 18-N hosting the desired original media content item. Once connected, one or more of the peer servers 18-2 through 18-N begin streaming the desired original media content item to the playback function 28. In one embodiment, the playback function 28 connects to only one of the peer servers 18-2 through 18-N hosting the desired original media content item, or a desired segment thereof. Alternatively, multiple peer servers 18-2 through 18-N hosting the desired media content item may operate in a collaborative manner to stream the desired media content item to the playback function 28. As the original media content is streamed to the playback function 28, the playback function 28 optionally processes the streaming original media content item and outputs the streaming original media content item or the processed streaming media content item to the buffer 30. From the buffer 30, the streaming original media content item is passed to the associated display via the switching function 32 where it is presented to the user(s).

While the original media content item is streamed to the playback function 28, the network monitoring function 34 monitors a quality of the network connection (step 104). Note that the network monitoring function 34 may be controlled by the playback function 28 to begin operation when playback begins and to end operation when playback ends. The network monitoring function 34 may monitor the quality of the network connection by monitoring a status of the buffer 30, monitoring the network connection(s) to the one or more of the peer servers 18-2 through 18-N streaming the original media content item, or both. Note that, in the embodiment illustrated in FIG. 2, the buffer 30 provides a status signal to the network monitoring function 34. The status signal may indicate whether, for example, the buffer 30 is empty, almost empty, half-full, almost full, or full. Alternatively, the status signal may provide a percentage that is indicative of an amount of occupied space in the buffer 30. The network monitoring function 34 may monitor the status of the network connections to the one or more of the peer servers 18-2 through 18-N streaming the original media content item using any known technique such as, for example, link quality, bandwidth, availability, speed, or the like.

Based on the quality of the network connection, the network monitoring function 34 determines whether to switch playback to the illustration media content item 36 (step 106). In general, the network monitoring function 34 determines that playback should be switched to the illustration media content item 36 when the quality of the network connection is poor. For example, the network monitoring function 34 may decide to switch playback to the illustration media content item 36 if the buffer 30 is empty or almost empty, if the bandwidth or speed of the network connection to the one or more of the peer servers 18-2 through 18-N streaming the original media content item falls below a predetermined threshold, or if the network connection to the one or more of the peer servers 18-2 through 18-N streaming the original media content item fails or is otherwise unavailable. In this embodiment, the network monitoring function 34 monitors the status of the buffer 30 and the status of the network connection while the original media content item is streamed to and output by the playback function 28. The streaming original media content is clocked out of the buffer 30 at the desired playback rate. If the status of the buffer 30 is such that the buffer 30 will be or is empty or if the network connection fails, the network monitoring function 34 determines that the quality of the network connection is poor and, therefore, playback should be switched to the illustration media content item 36.

If the network monitoring function 34 determines that playback should not be switched to the illustration media content item 36, the process returns to step 104. If the network monitoring function 34 determines that playback should be switched to the illustration media content item 36, playback is switched from the streaming original media content to the illustration media content item 36 (step 108). More specifically, in the embodiment illustrated in FIG. 2, the network monitoring function 34 controls the switching function 32 to switch the output of the switching function 32 from the streaming media content output of the playback function 28 to the synchronized illustration media content output of the playback function 28. As a result, the playback agent 20-1 effects playback of the illustration media content item 36 while the quality of the network connection is poor.

Depending on the particular embodiment, the playback agent 20-1 attempts to reestablish the connection to the one or more peer servers 18-2 through 18-N if the connection failed, attempts to establish a new connection to one or more of the peer servers 18-2 through 18-N hosting the original media content, and/or monitors the quality of the existing network connection (step 110). More specifically, if a connection failure caused the switch to the illustration media content item 36, the playback function 28 may attempt to reestablish the connection or establish a new connection in order to obtain the streaming original media content item. In contrast, if an empty buffer status, low bandwidth, low connection speed, or low link quality caused the switch to the illustration media content item 36, the network monitoring function 34 may continue to monitor the buffer 30 and/or the bandwidth, connection speed, and/or link quality of the network connection. In addition or alternatively, if an empty buffer status, low bandwidth, low connection speed, or low link quality caused the switch to the illustration media content item 36, the playback function 28 may attempt to establish a new connection to one or more of the peer servers 18-2 through 18-N hosting the original media content.

The network monitoring function 34 then determines whether to switch back to the streaming original media content item (step 112). The network monitoring function 34 decides to switch back to the streaming original media content item when the quality of the network connection providing the streaming original media content item is acceptable. For example, the network monitoring function 34 may decide to switch back to the streaming original media content item when the buffer 30 is no longer empty or no longer almost empty, when the bandwidth and/or connection speed of the network connection providing the streaming original media content item is above a predetermined threshold, when the link quality of the network connection providing the streaming original media content item is above a predetermined threshold, when a network connection for streaming the original media content item is available, or the like.

If the network monitoring function 34 determines that playback is not to be switched back to the streaming original media content item, the process returns to step 110. If the network monitoring function 34 determines that playback is to switch back to the streaming original media content item, the network monitoring function 34 controls the switching function 32 to switch the output of the switching function 32 back to the streaming media content output of the playback function 28 (step 114). Note that when the quality of the network connection improves to an acceptable level, the playback function 28 may synchronize the streaming original media content item to the current point in playback of the illustration media content item 36. Thus, if the switch to the illustration media content item 36 occurred at point A in playback of the streaming original media content item and playback of the illustration media content item 36 is at a point corresponding to point A plus 10 minutes when the quality of the network connection returns to an acceptable level, the playback function 28 may resume playback of the streaming original media content item at 10 minutes after point A in playback. Alternatively, the playback function 28 may resume playback of the streaming original media content item at point A. At this point, the process returns to step 104 and is repeated until playback of the original media content item is complete or terminated by the user.

Figure 4:
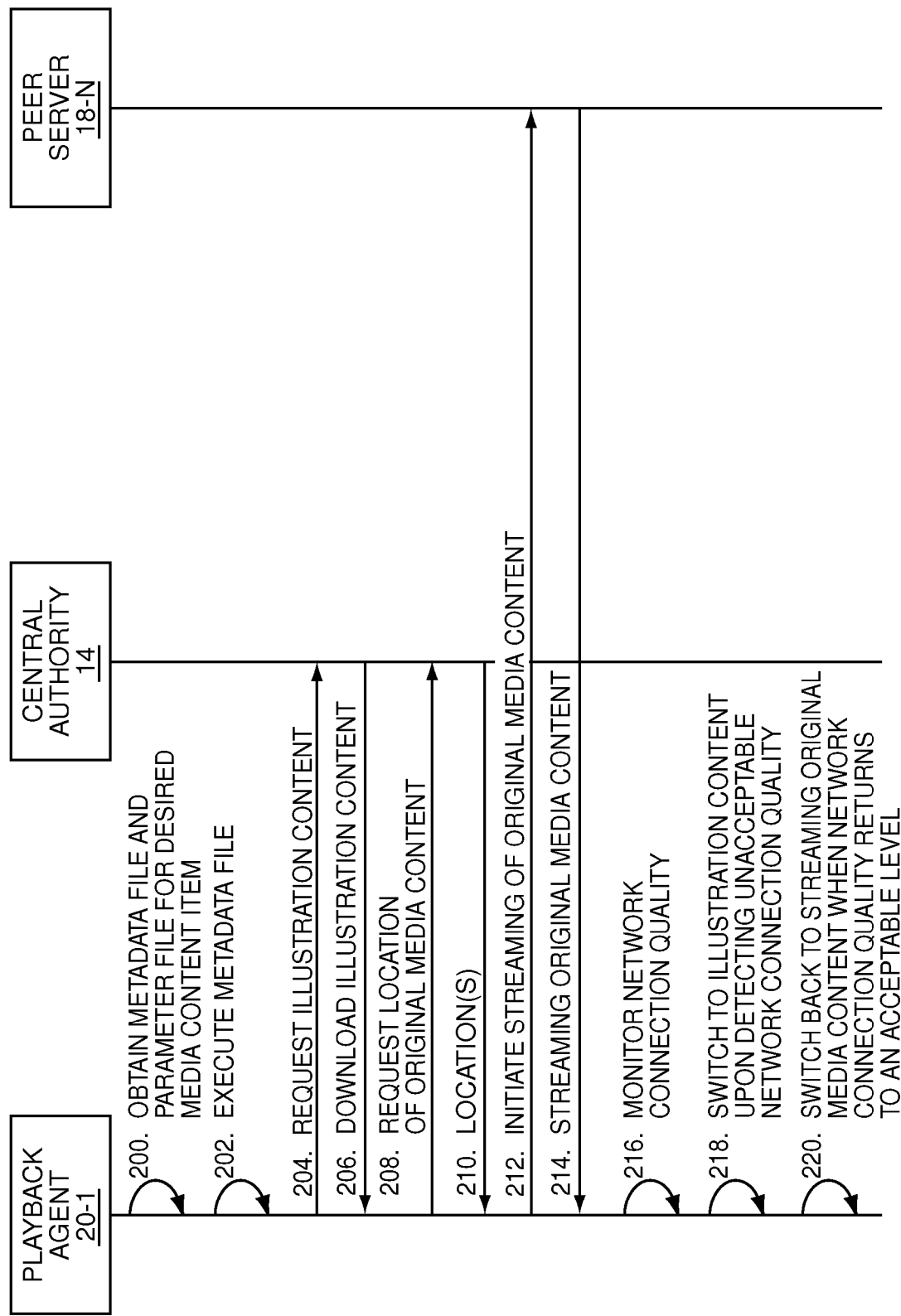
FIG. 4 illustrates the operation of the system of FIG. 1 according to one embodiment of the present invention.

FIG. 4 illustrates the operation of the system 10 of FIG. 1 according to one embodiment of the present invention. First, the playback agent 20-1 obtains a metadata file for a desired media content item (step 200). The metadata file may include, for example, a Uniform Resource Locator (URL) or other contact information enabling the playback agent 20-1 to contact the central authority 14 to download an illustration media content item corresponding to the original media content item, the parameter file or a reference enabling the playback agent 20-1 to obtain the parameter file for the illustration media content item, a number of segments for the original media content item, and the like. The playback agent 20-1 may obtain the metadata file in response a P2P query propagated to the peer servers 18-2 through 18-N. The query may be initiated by the user of the playback device 12-1. As another example, the playback agent 20-1 may maintain a menu or other listing of media content items hosted in the system 10 where the metadata files for the media content items are linked to or referenced by corresponding entries in the menu or listing.

The playback agent 20-1 then executes the metadata file (step 202). By executing the metadata file, the playback agent 20-1 sends a request to the central authority 14 for the illustration media content item corresponding to the desired original media content item (step 204). The playback agent 20-1 then downloads the illustration media content item from the central authority 14 (step 206). Once the illustration media content item is downloaded, the playback agent 20-1 continues to execute the metadata file by requesting a location or locations of the original media content items in the system 10 from the central authority 14 (step 208). In response, the central authority 14 returns one or more locations of the original media content items in the system 10 (step 210). The one or more locations are, for example, addresses or identifiers (IDs) of one or more of the peer servers 18-2 through 18-N hosting the original media content item or segments of the original media content item. In this embodiment, for simplicity, the original media content item is hosted by the peer server 18-N.

The playback agent 20-1 then contacts the peer server 18-N and initiates streaming of the original media content item (step 212). In response, the peer server 18-N begins streaming the original media content item to the playback agent 20-1 (step 214). While the original media content item is being streamed to the playback agent 20-1, the playback agent 20-1 monitors the quality of the network connection (step 216). In this example, at some point, the quality of the network connection becomes unacceptable. As such, the playback agent 20-1 switches playback to the illustration media content item (step 218). Thereafter, when the quality of the network connection returns to an acceptable level, the playback agent 20-1 switches playback back to the streaming original media content item (step 220).

Figure 5:
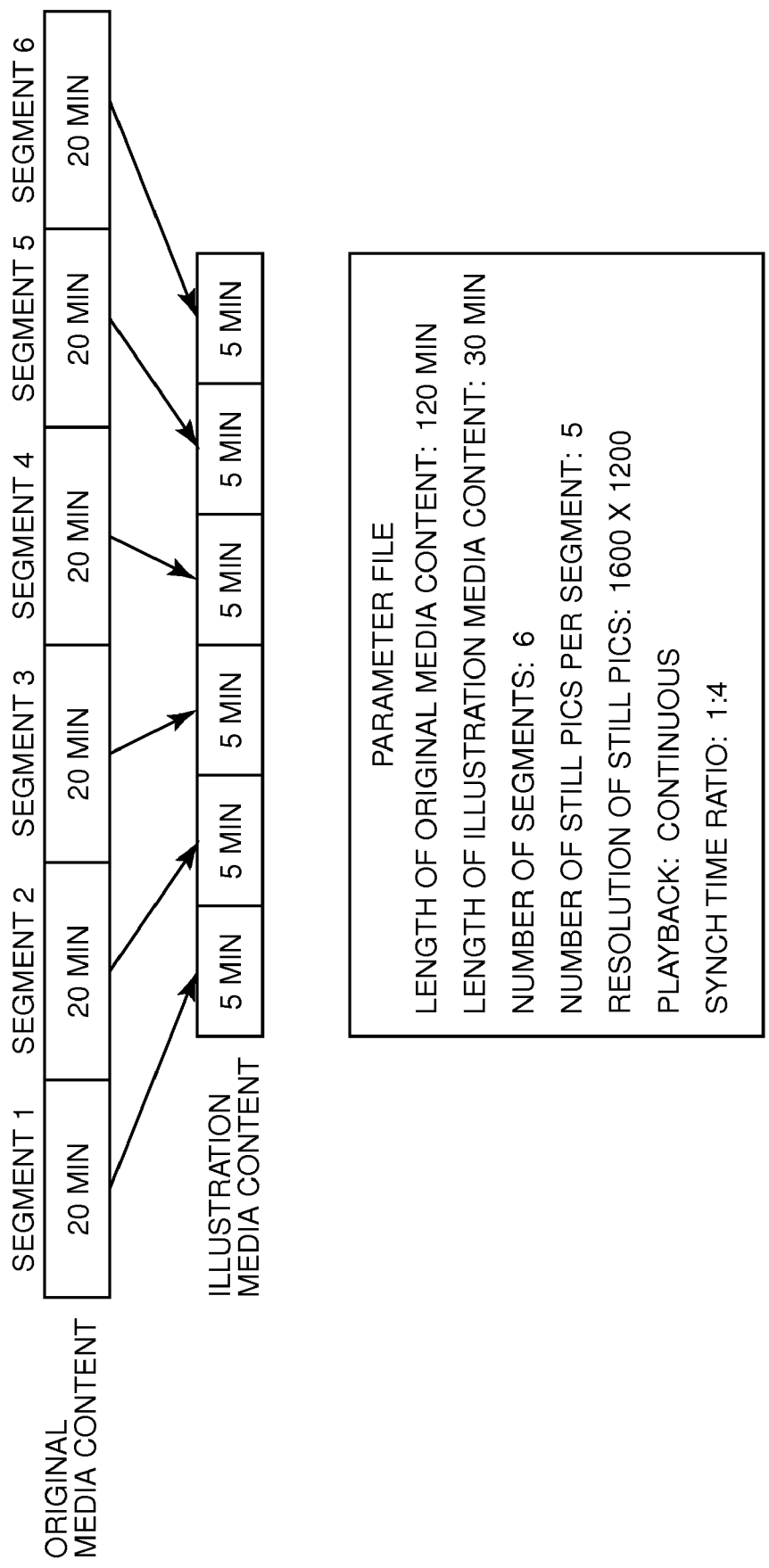
FIG. 5 illustrates an exemplary embodiment of an original media content item, a corresponding illustration media content item, and an associated parameter file according to one embodiment of the present invention.

FIG. 5 illustrates an exemplary embodiment of an original media content item, a corresponding illustration media content item, and a parameter file for the illustration media content item according to one embodiment of the present invention. As shown, the original media content item is divided into a number of 20 minute segments. Note that the length of the segments may be any desired length. Further, the segments do not have to be the same length. The original media content item may be logically segmented where the original media content item remains a single file or actually segmented where the original media content item is segmented into a number of files. For each segment of the original media content item, there is a corresponding segment of the illustration media content item. Each segment of the illustration media content item is derived from the corresponding segment of the original media content item. For example, the first segment of the illustration media content item may be a slideshow formed by still pictures corresponding to a number of frames of the first segment of the original media content item. In addition, the first segment of the illustration media content item may include the audio component of the first segment of the original media content item, a narrative or summary of the first segment of the original media content item, or the like.

The parameter file generally includes information describing the original media content item, information describing the illustration media content item, and information enabling synchronization of the original media content item and the illustration media content item. In this example, the parameter file includes a synchronization time ratio of 1:4 which indicates that each one minute segment of the illustration media content item corresponds to a four minute segment of the original media content item. Thus, the parameter file may be used to, for example, synchronize playback of the original media content item at a point 12 minutes into the first segment of the original media content item to a point 3 minutes into the first segment of the illustration media content item.

In one embodiment of the present invention, the original media content item and the illustration media content item are both created by a content creator and injected into the system 10 (FIG. 1). More specifically, a creator of the original media content item may be, for example, a movie producer or production company. The producer or production company may also create the illustration media content item for the original media content item. For example, if the illustration media content item is to be a slideshow with accompanying audio content, the producer or production company may select desired frames from the original media content to be used as still pictures for the slideshow and create a narrative or summary to accompany the slideshow. Alternatively, the illustration media content item may be created by some other entity. In addition, one or more advertisements may be included in the illustration media content. For example, one or more overlay advertisements may be overlaid upon one or more of the still images in the slideshow.

The original media content item and the illustration media content item may be injected into the system 10 in any desired manner. For example, the creator of the illustration media content item and the original media content item may provide the illustration media content item and the original media content item to the central authority 14 (FIG. 1). The central authority 14 may then store the illustration media content item and either store the original media content item until, for example, it is requested by one of the playback devices 12-1 through 12-N or push the original media content item to one or more of the playback devices 12-1 through 12-N. Depending on the implementation of the system 10, the original media content item may be segmented into a number of files where the segments may be hosted by the same or different peer servers 18-1 through 18-N. For example, the system 10 may use a P2P scheme similar to that used by BitTorrent. Note that in one embodiment, the central authority 14 may select and insert advertisements into the illustration media content item. For example, the central authority 14 may select and insert overlay advertisements into the illustration media content item. As an alternative, rather than injecting the original media content item and/or the illustration media content item at the central authority 14, the original media content item and/or the illustration media content item may be injected at one of the playback devices 12-1 through 12-N.

Figure 6:
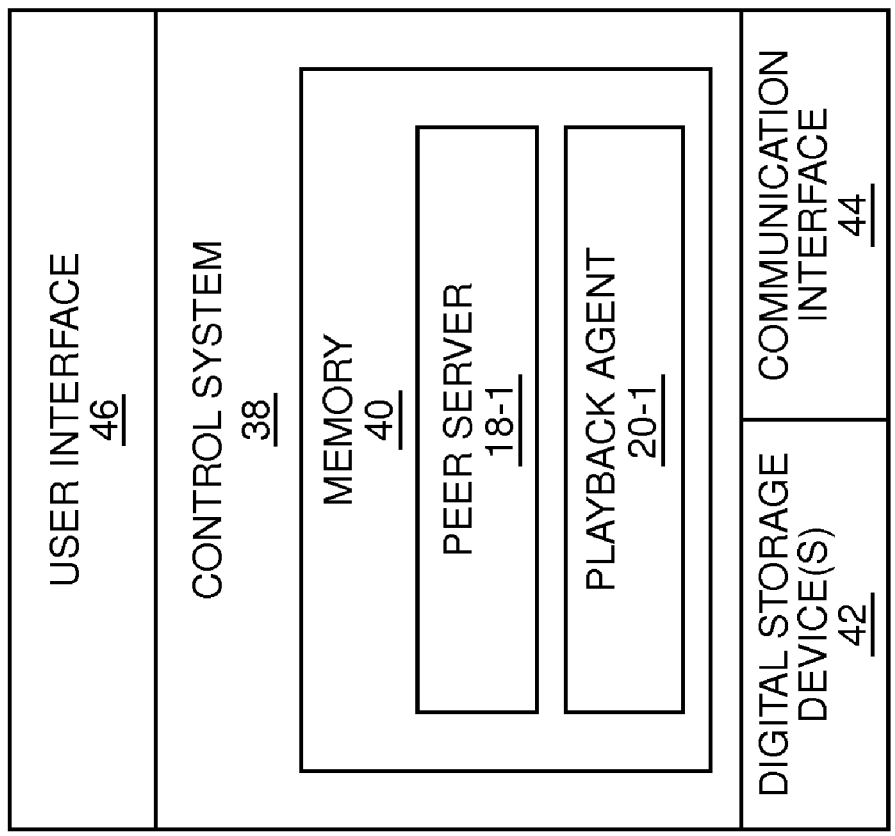
FIG. 6 is a block diagram of one of the peer playback devices of FIG. 1 according to one embodiment of the present invention.

FIG. 6 is a block diagram of the playback device 12-1 of FIG. 1 according to one embodiment of the present invention. In general, the playback device 12-1 includes a control system 38 having associated memory 40. In this embodiment, both the peer server 18-1 and the playback agent 20-1 are implemented in software and are stored in memory 40 during execution. However, the present invention is not limited thereto. The peer server 18-1 and the playback agent 20-1 may each be implemented in software, hardware, or a combination thereof. The playback device 12-1 may also include one or more digital storage devices 42 such as, for example, one or more hard disk drives, one or more internal or removable memory units, or the like. The playback device 12-1 also includes a communication interface 44 communicatively coupling the playback device 12-1 to the network 16 (FIG. 1). The playback device 12-1 also includes a user interface 46, which may include components such as, for example, one or more user input devices, a display, speakers, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operating a peer playback device of a plurality of peer playback devices forming a Peer-to-Peer (P2P) network, comprising:
   downloading an illustration media content item derived from a desired original media content item where the illustration media content item is distinct from the desired original media content item;
   storing the illustration media content at the peer playback device;
   initiating streaming of the desired original media content item to the peer playback device from at least one second peer playback device of the plurality of peer playback devices hosting the desired original media content item after storing the illustration media content at the peer playback device;
   effecting playback of the desired original media content item as the desired original media content item is streamed to the peer playback device;
   monitoring a quality of a network connection over which the desired media content item is streamed to the peer playback device; and
   switching playback from the desired original media content item streamed from the at least one second peer playback device to the illustration media content item stored at the peer playback device if the quality of the network connection falls below a defined level.

2. The method of claim 1 wherein the desired original media content item is stored in a buffer in preparation for playback at the peer playback device as the desired original media content item is streamed to the peer playback device, and monitoring the quality of the network connection comprises monitoring a status of the buffer.

3. The method of claim 2 wherein switching playback comprises switching playback from the desired original media content item streamed from the at least one second peer playback device to the illustration media content item if the status of the buffer indicates that the buffer is empty.

4. The method of claim 2 wherein switching playback comprises switching playback from the desired original media content item streamed from the at least one second peer playback device to the illustration media content item if the status of the buffer indicates that an amount of data stored in the buffer is less than a defined threshold.

5. The method of claim 1 wherein monitoring the quality of the network connection comprises monitoring at least one of a group consisting of: bandwidth, connection speed, link quality, and availability of the network connection over which the desired original media content item is streamed to the peer playback device from the at least one second peer playback device.

6. The method of claim 5 wherein switching playback comprises switching playback from the desired original media content item streamed from the at least one second peer playback device to the illustration media content item if at least one event occurs from a group consisting of: the bandwidth of the network connection falls below a defined bandwidth threshold, the connection speed of the network connection falls below a defined connection speed threshold, the link quality of the network connection falls below a defined link quality threshold, and the network connection is no longer available.

7. The method of claim 1 further comprising synchronizing the illustration media content item to the desired original media content item streamed to the peer playback device prior to switching playback from the desired original media content item to the illustration media content item.

8. The method of claim 1 wherein the desired original media content item is a video content item, and the illustration media content item comprises a slideshow of still pictures, wherein the still pictures are frames of the desired original media content item.

9. The method of claim 8 wherein the illustration media content item further comprises an audio component accompanying the slideshow.

10. The method of claim 9 wherein the audio component of the illustration media content item is one of a group consisting of: a narrative of the desired original media content item or an audio component of the desired original media content item.

11. The method of claim 1 wherein the illustration media content item is a low quality version of the desired original media content item.

12. The method of claim 1 wherein the illustration media content item comprises at least one advertisement.

13. The method of claim 1 wherein downloading the illustration media content item comprises one of a group consisting of: downloading the illustration media content item from a central authority associated with the P2P network and downloading the illustration media content item from another peer playback device of the plurality of peer playback devices.

14. The method of claim 1 further comprising, after switching from the desired original media content item to the illustration media content item, switching back to the desired original media content item.

15. The method of claim 14 wherein switching back to the desired original media content item comprises switching back to the desired original media content item when the quality of the network connection increases to a second defined level that is greater than or equal to the defined level.

16. The method of claim 14 wherein switching back to the desired original media content item comprises:
   initiating streaming of the desired original media content item from at least one of the plurality of peer playback devices via a new connection; and
   switching playback from the illustration media content item to the desired original media content item.

17. A peer playback device in a Peer-to-Peer (P2P) network formed by a plurality of peer playback devices including the peer playback device, comprising:
   a communication interface of the peer playback device communicatively coupling the peer playback device to the P2P network; and
   a control system associated with the communication interface and adapted to:
      download and store an illustration media content item derived from a desired original media content item where the illustration media content item is distinct from the desired original media content item;
      storing the illustration media content;
      initiate streaming of the desired original media content item to the peer playback device from at least one second peer playback device of the plurality of peer playback devices after storing the illustration media content;
      effect playback of the desired original media content item at the peer playback device as the desired original media content item is streamed to the peer playback device;
      monitor a quality of a network connection over which the desired original media content item is streamed to the peer playback device; and
      switch playback from the desired original media content item streamed from the at least one second peer playback device to the illustration media content item stored at the peer playback device if the quality of the network connection falls below a defined level.

18. The peer playback device of claim 17 wherein the desired original media content item is stored in a buffer in preparation for playback as the desired original media content item is streamed to the peer playback device, and the control system is further adapted to:
   in order to monitor the quality of the network connection, monitor a status of the buffer; and
   switch playback from the desired original media content item streamed from the at least one second peer playback device to the illustration media content item if the status of the buffer indicates that an amount of data stored in the buffer is less than a defined threshold.

19. The peer playback device of claim 17 wherein the control system is further adapted to:
   in order to monitor the quality of the network connection, the control system is further adapted to monitor at least one of a group consisting of: bandwidth, connection speed, link quality, and availability of the network connection over which the desired original media content item is streamed to the peer playback device from the at least one second peer playback device; and
   switch playback from the desired original media content item streamed from the at least one second peer playback device to the illustration media content item if at least one event occurs from a group consisting of: the bandwidth of the network connection falls below a defined bandwidth threshold, the connection speed of the network connection falls below a defined connection speed threshold, the link quality falls below a defined link quality threshold, and the network connection is no longer available.

20. The peer playback device of claim 17 wherein the control system is further adapted to synchronize the illustration media content item to the desired original media content item streamed to the peer playback device prior to switching playback from the desired original media content item to the illustration media content item.

21. The peer playback device of claim 17 wherein the desired original media content item is a video content item, and the illustration media content item comprises a slideshow of still pictures, wherein the still pictures are frames of the desired original media content item.

22. The peer playback device of claim 21 wherein the illustration media content item further comprises an audio component accompanying the slideshow, wherein the audio component is one of a group consisting of: a narrative of the desired original media content item or an audio component of the desired original media content item.

23. The peer playback device of claim 17 wherein the illustration media content item is a low quality version of the desired original media content item.

24. The peer playback device of claim 17 wherein the control system is further adapted to download the illustration media content item from one of a group consisting of a central authority associated with the P2P network and another peer playback device of the plurality of peer playback devices.

25. The method of claim 1 further comprising, after switching from the desired original media content item to the illustration media content item, switching back to the desired original media content item.

* * * * *